Figure 1:
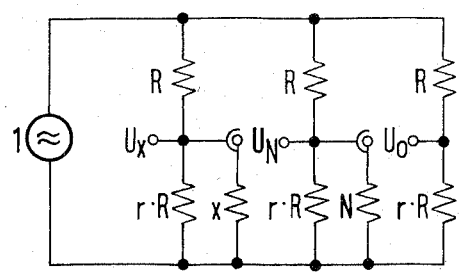

Dec. 20, 1966     K. SCHLÜTER     3,293,545
CIRCUIT ARRANGEMENT COMPRISING VOLTAGE DIVIDER NETWORKS
FOR MEASURING IMPEDANCES
Filed Aug. 24, 1964     2 Sheets-Sheet 1

3,293,545
CIRCUIT ARRANGEMENT COMPRISING VOLTAGE DIVIDER NETWORKS FOR MEASURING IMPEDANCES

Klaus Schlüter, Munich, Germany, assignor to Siemens & Halske Aktiengesellschaft, Berlin and Munich, Germany, a corporation of Germany
Filed Aug. 24, 1964, Ser. No. 392,340
Claims priority, application Germany, Aug. 26, 1963, S 86,895; Sept. 30, 1963, S 87,672
12 Claims. (Cl. 324—57)

Different bridge circuits are known in the art for measing impedances, for example, the Wheatstone bridge and the Maxwell bridge, whereby resistances or capacitances are provided in the bridge compensation branch. In accordance with another measuring method, the impedance is determined as a quotient according to Ohm's law, wherein measurements are made on one hand of the impedance dropping voltage, and on the other hand of the current flowing through the impedance by means of a voltage measurement across a resistance of known magnitude in series therewith.

All of the described methods have a substantial disadvantage in that they fail in cases involving high measuring frequencies, because sufficiently phase-equal variable resistances of known magnitudes can not be realized. In case of known impedance bridges, which are to be used for high measuring frequencies, the resistances are, in view of the above, designed in the form of semi-conductors, which are adjusted magnitude-wise by means of a self-adjusting auxiliary bridge. The disadvantage of such an arrangement resides not only in the requirement of excessive circuitry, but also in the small variability range, as well as in the comparatively high inherent angle of the resistance. In case of very high measuring frequencies, the measuring values are falsified by the measuring circuits themselves, which is particularly disadvantageous in the above-mentioned quotient methods.

The above-mentioned disadvantages in the application of measuring methods to the measurement of impedances are avoided in the present invention. The invention relates to a circuit arrangement for measuring impedances, particularly at high measuring frequencies, comprising three similarly constructed complex voltage divider networks, each consisting of a series combination of a first impedance and a second impedance, a signal source being connected in parallel with the respective series combination and operative to apply a test voltage thereto. The impedance to be measured is connected in parallel with the second impedance of the first divider network and a fixed standard impedance is connected in parallel with the second impedance of the second network. From the voltage drops $U_x$, $U_N$ and $U_0$ across the second impedances of the first, second and third divider networks, respectively, by suitable evaluation circuit means a quotient may be derived from the products of the differences between certain of said voltages and certain of the respective voltages, whereby such quotient determines the value and phase and thus the real portion and the imaginary portion of the impedance to be measured, in accordance with the equations:

$$X = N \cdot \frac{U_x(U_0 - U_n)}{U_n(U_0 - U_x)}; \frac{X-N}{N} = \frac{U_0(U_x - U_N)}{U_N(U_0 - U_x)} \quad (1)$$

X is the unknown impedance
N is the known impedance, for instance a resistance
$U_x$ is the voltage in the parallel circuit of the unknown impedance and the partial resistance of the first voltage divider
$U_N$ is the voltage on the parallel circuit of the known impedance and the partial resistance of the second voltage divider
$U_0$ is the voltage across the partial resistance of the third voltage divider As can be seen from the above equations, the voltage divider network impedances do not influence the results of the measurements, so that such impedances can be as complex as desired, as long as the conditions are fulfilled that the respective impedances of all the voltage divider networks properly correspond.

As a particular advantage there must be taken into consideration the possible undesired disturbing components of the utilized fixed standard impedances, for example, the undesirable reactance of a utilized resistance, or the undesired resistance of a capacitance of known magnitude, as well as the conductances of the coupling circuits connected to the voltage dividers which undesired components, in a simple manner, can be made inactive by provision of corresponding reactances or resistances as compensating elements, which may be connected to the corresponding other voltage divider networks. The above-named disturbing components are hereby considered to be the inherent values of the voltage divider network impedances and are compensated by connection of additional compensating elements to the other voltage divider networks in such a manner that the three voltage divider networks, with respect to their individual resultant impedances are again of equal value. The obtained measuring accuracy is dependent upon remaining deviations between the three voltage divider networks.

Further advantages and specific features of the measuring arrangement can be seen from the two in the following described exemplary modifications of the preferred construction of the present invention.

Figure 2:
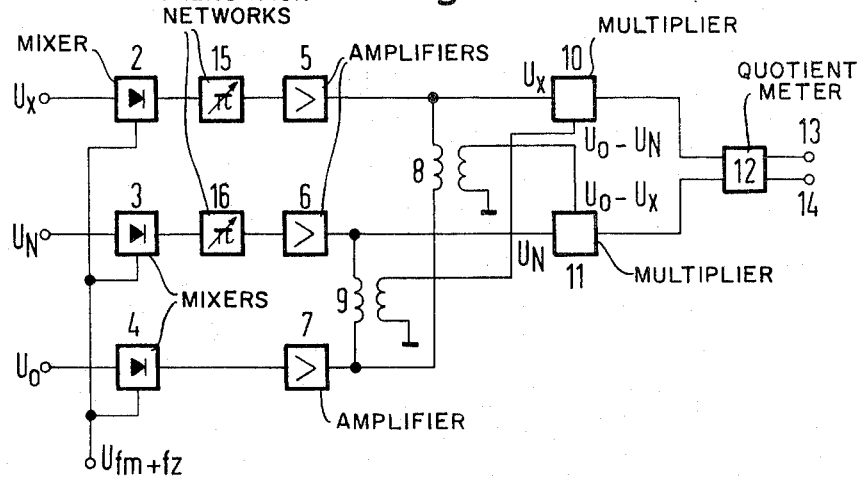
Figure 3:
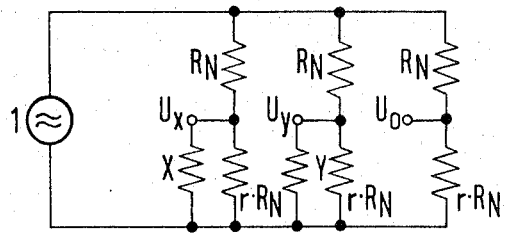
Figure 4:
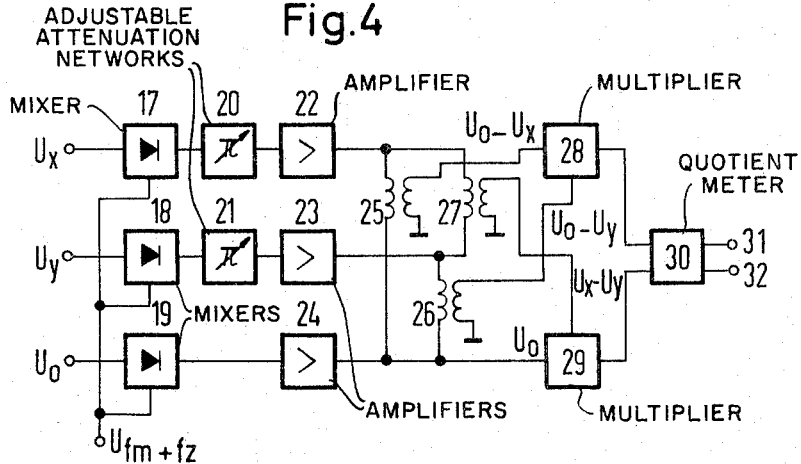

In the drawings:
FIG. 1 is a circuit diagram of an arrangement utilizing the invention, illustrating the principles involved;
FIG. 2 is a circuit diagram, in block form, of an evaluation circuit for effecting the desired measurements;
FIG. 3 is a circuit diagram, similar to FIG. 1, illustrating the application of the invention to two unknown impedances; and
FIG. 4 is a circuit diagram, similar to FIG. 2, of an evaluation circuit for effecting the measurements involved in the circuit of FIG. 3.

As illustrated in FIG. 1, there are provided three voltage divider networks connected to a signal source 1, said divider networks each consisting of a series combination of a first impedance R and a second impedance $r \cdot R$. R can herein be a complex impedance and the relation number $r$ can also be complex. The unknown impedance X is connected in parallel to said second impedance $r \cdot R$ of the first voltage divider network, and the standard impedance N is connected in parallel to the corresponding second impedance $r \cdot R$ of the second voltage divider network. The voltages $U_x$ and $U_N$ obtained across these respective parallel circuits, together with the voltage $U_0$ obtained across the second impedance $r \cdot R$ of the third voltage divider network can then be evaluated in accordance with the relations previously set forth.

FIG. 2 illustrates a simple evaluation circuit, which will determine from the voltages $U_x$, $U_N$ and $U_0$, in accordance with the Formula 1, a measuring magnitude which corresponds to the unknown impedance X. Mixers 2, 3 and 4 are therein provided, which, by means of a carrier voltage U of a frequency $f_m + f_z$, transform the respective voltages of the measuring frequency $f_m$ into an intermediate frequency $f_z$. From the intermediate frequency voltages, over the four-terminal-networks with adjustable attenuation 15 and 16 and the amplifiers 5, 6 and 7, there is formed, by means of a transformer 8, the differential voltage $U_0 - U_x$. By means of a further transformer 9, there is formed the differential voltage $U_0 - U_N$. In the additionally connected multipliers 10 and 11, on the one hand the differential voltage $U_0-U_N$, is multiplied by the voltage $U_x$, and on the other hand, the differential voltage $U_0-U_x$ is multiplied by the voltage $U_N$, so that two voltages are obtained which respectively correspond to the numerator and denominator of the equation heretofore set forth. These voltages are finally directed to the inputs of a quotient-forming circuit which, per se, is known, for example, as a quotient meter 12 on the output terminals 13 and 14 of which are obtained the voltages, which correspond to the value and the phase and thus to the real portion and the imaginary portion of the unknown impedance.

In the event its standard impedance N comprises a resistance, the possible disturbing capacitive components can be compensated by connection of additional corresponding capacitances to the second impedances $r \cdot R$ of the other two voltage divider networks which do not contain capacity. If on the other hand a standard capacitance is utilized, its undesired resistance component can be taken into consideration by the additional connection of compensation resistances to the second impedances $r \cdot R$ of the other two voltages divider networks. Conductances of the coupling circuits for the voltages $U_x$, $U_N$ and $U_0$, in particular the input conductances of the mixers 2, 3 and 4 can be similarly treated by the connection of additional compensation elements to the second impedances $r \cdot R$ in such a manner that a substantial compensation between these second impedances is obtained.

For the measurement of low ohmic resistances X, the measuring arrangement can be substantially simplified in that in the first approximation, the equation $$X = N \frac{U_x}{U_N}$$

is evaluated. Accordingly in FIG. 2, the circuit elements 4, 7, 8, 9, 10 and 11 may be eliminated. The assumption therefore is that the second impedances $r \cdot R$ are very much larger as compared with X, respectively N.

The four-terminal-networks indicated by numerals 15 and 16, providing adjustable attenuation in the circuit of FIG. 2, are utilized for the adjustment of the measuring range, whereby an increase of the attenuation adjustable at 15, corresponds to an increase of the standard impedance, and an increase of the attenuation, adjustable at 16 corresponds to a diminishing of the standard impedance.

Another embodiment of the present invention is characterized in that the first impedances of the divider networks comprise fixed standard impedances of equal value, with a first impedance to be measured being connected in parallel with the second impedance of the first divider network, and a second impedance to be measured being connected in parallel with the second impedance of the second divider network. From the voltage drops $U_x$, $U_y$ and $U_0$ across the second impedance of the first, second and third divider networks, respectively, by suitable evaluation circuit means a quotient may be derived from the products of the difference between certain of said voltages with certain of said voltages or the difference therebetween, whereby such quotient determines the value and phase and thus the real portion and the imaginary portion of the difference of the first and second impedances to be measured, in accordance with the following equation:

$$\frac{X-Y}{R_N} = \frac{r}{1+r} \cdot \frac{U_0(U_x-U_y)}{(U_0-U_x)(U_0-U_y)} \qquad (2)$$

in which formula:
X is the first unknown impedance
Y is the second unknown impedance
$R_n$ is the impedance of known magnitude
$r$ is the voltage divider relation
$U_x$ is the voltage across the parallel connection of the first unknown impedance $U_N$ is the voltage across the parallel connection of the second unknown impedance
$U_0$ is the voltage across the partial resistance of the third voltage divider By means of the last described modification of the present invention there also can be determined the magnitude of the first unknown impedance X, in that voltage $U_x$ which is obtained on the second impedance of the first divider network is evaluated with the voltage $U_0$ on the corresponding second impedance of the third voltage divider network in accordance with the equation:

$$\frac{X}{R_N} = \frac{r}{1+r} \cdot \frac{U_x}{U_0-U_x} \qquad (3)$$

In this equation X and $U_x$ can be replaced by Y and $U_y$, so that the second unknown impedance Y can also be determined.

The equations indicated under (2) and (3) permit an approximate evaluation, in the event the factors $r/1+r$ are disregarded. This can be obtained with a relatively exact accuracy, when the voltage divider relation $r$ is made very large. In this case the value of the factors $r/1+r$ contained in the above equations approximates the value of 1.

In the last described embodiment of the present invention, it is thus possible with utilization of the same amount of apparatus, particularly with regard to the evaluation circuit, to effect an approximate differential measurement on two unknown impedances, or the approximate determination of each of such two impedances, with the aid of a simplified arrangement which consists for each impedance of only two voltages divider networks, namely, the respective one associated therewith and the third voltage divider network.

The last described modification of the present invention is illustrated in FIG. 3 and 4, and will be described with reference thereto. This measuring arrangement consists of three voltage divider networks constructed in similar manner, which are connected in parallel to a signal source 1. The first impedances of such voltage divider networks are constructed as equal standard impedances of known magnitude $R_N$, while the second voltage divider network impedances $r \cdot R_N$ which are multiplied by the voltage divider factor $r$, are designed as high ohmic resistances by suitable selection of the magnitude of $r$ relative to that of $R_N$. The first unknown impedance X is connected in parallel to the second impedance of the first voltage divider network while the second unknown impedance Y is connected in parallel to the second impedance of the second voltage divider network. The voltages obtained across these parallel connections are designated as $U_x$ and $U_y$, while the voltage obtained across the second impedance of the third voltage divider network is indicated as $U_0$.

The evaluation circuit of FIG. 4 illustrates how the determination of the difference between the impedances X and Y from the voltages $U_x$, $U_y$ and $U_0$ can be obtained. For this purpose there are provided mixers 17, 18 and 19 which, by means of the carrier voltage U of the frequency $f_m+f_z$ the named voltages of the measuring frequency $f_m$, are transformed into the intermediate frequency $f_z$. From the four-terminal-network with adjustable attenuation 20 and 21 and the amplifiers 22, 23 and 24 of the intermediate frequency voltages there is developed, by means of a transformer 25, the differential voltage $U_0-U_x$, and by means of another transformer 26 there is developed the differential voltage $U_0-U_y$. In additionally connected multipliers 28 and 29 is then respectively formed on the one hand the product of the differential voltages $U_0-U_x$ and $U_0-U_y$, and on the other hand the product of $U_0$ and $U_x-U_y$, so that there are formed two output voltages, which will respectively correspond to the denominator and the numerator of the equation mentioned under (2). These voltages are finally directed to the inputs of a circuit 30 which is a quotient forming a circuit known per se, for example, as a quotient meter, and at the output terminals 31 and 32 of which can be obtained voltages which correspond in magnitude and phase to the real portion and the imaginary portion of the difference of the impedances X and Y.

Each of the two impedances X and Y can be determined in approximation in accordance with the Equation 3, in such a manner that the voltage on the corresponding voltage divider network, i.e., $U_x$ or $U_y$ can be evaluated with the voltage $U_0$ on the third voltage divider network. The evaluation circuit which is indicated in FIG. 3 can then be simplified in such a manner that, for example, for the measurement of X, the circuit elements 18, 21, 23, 38 and 29 may be eliminated as well as two of the three described transformers. The accuracy of the effected measurements is dependent upon how close the factor $r/1+r$ can be approximated to the value of 1.

An advantageous field of application for the differential measurements of two impedances is, for instance, in measurements of loss angles of condensers. In this case, the condenser to be measured is represented by the impedance X, while Y is formed by an additional capacitance, which magnitude-wise is adjusted such, that the capacitive component of X is substracted and respectively compensated. This provides the possibility of an exact measurement of the relatively very small resistance of X, and thus of the loss angle. The magnitude adjustment of the capacitance Y, can in this case be replaced by a corresponding adjustment of the voltage $U_y$ influencing the four-terminal network 21.

Changes may be made within the scope and spirit of the appended claims which define what is believed to be new and desired to have protected by Letters Patent.

I claim:

1. A circuit arrangement for measuring impedance, particularly at high measuring frequencies, comprising three similarly constructed complex voltage divider networks, each comprising a series combination of a first impedance and a second impedance, a single source, the output of which is connected in parallel with the respective series combination, operative to apply a test voltage thereto, an impedance to be measured connected in parallel with said second impedance of said first divider network, a fixed standard impedance connected in parallel with the second impedance of said second divider network, circuit means operatively connected to the respective voltage divider networks for deriving the difference of the voltage drop $U_0$ across said second impedance of said third divider network and the voltage drop $U_N$ across said second impedance of said second divider network, and the difference of said voltage drop $U_0$ and of the voltage drop $U_x$ across said second impedance of said first divider network, circuit means operatively connected to said first mentioned circuit means for forming the product of said voltage drop $U_x$ and said difference of said voltage drops $U_0$ and $U_N$, further circuit means operatively connected to said first mentioned circuit means for forming the product of said voltage drop $U_N$ and said difference of said voltage drops $U_0$ and $U_x$, and circuit means operatively connected to said first and second mentioned product-forming means for producing the quotient from said products, said quotient providing a determination of the valve and phase and thus the real portion and the imaginary portion of the impedance to be measured.

2. A circuit arrangement for measuring impedance, particularly at high measuring frequencies, comprising three similarly constructed complex voltage divider networks, each comprising a series combination of a first impedance and a second impedance, a single source, the output of which is connected in parallel with the respective series combination, operative to apply a test voltage thereto, an impedance to be measured connected in parallel with said second impedance of said first divider network, a fixed standard impedance connected in parallel with the second impedance of said second divider network, circuit means operatively connected to the respective divider networks for deriving the difference of the voltage drop $U_x$ across said second impedance of said first divider network and the voltage drop $U_N$ across said second impedance of said second divider network, and the difference of the voltage drop $U_0$ across said second impedance of said third divider network and of said voltage drop $U_x$, circuit means operatively connected to said first mentioned circuit means for deriving the product of said voltage drop $U_0$ and said difference of said voltage drops $U_x$ and $U_N$, further circuit means operatively connected to said first mentioned circuit means for deriving the product of said voltage drop $U_N$ and said difference of said voltage drops $U_0$ and $U_x$, and circuit means operatively connected to said first and second mentioned product-forming means for producing the quotient from said products, said quotient providing a determination of the value and phase and thus the real portion and the imaginary portion of the difference of the impedance to be measured and the fixed standard impedance.

3. An arrangement according to claim 1, comprising in further combination reactances and resistances connected with said second impedances of said divider networks and which are so dimensioned that they correspond in magnitude to the undesired stray impedance components of said fixed standard impedance.

4. An arrangement according to claim 2, comprising in further combination reactances and resistances connected with said second impedances of said divider networks and which are so dimensioned that they correspond in magnitude to the undesired stray impedance components of said fixed standard impedance.

5. A circuit arrangement according to claim 1, wherein said means for computing the difference of said voltage drop $U_0$ and said voltage drop $U_N$ and for computing said difference of said voltage drop $U_0$ and of said voltage drop $U_x$ contain mixers for transforming such voltage drops from the measuring frequency by a lower intermediate frequency range.

6. A circuit arrangement according to claim 2, wherein said circuit means for computing the difference of said voltage drops $U_x$ and $U_N$ and the difference of said voltage drops $U_0$ and $U_x$ contain mixers for transforming such voltage drops from the measuring frequency to a lower intermediate frequency range.

7. A circuit arrangement according to claim 1, comprising in further combination four-terminal-networks with adjustable attenuation operatively connected respectively to said second impedances of said first and second divider networks.

8. A circuit arrangement according to claim 2, comprising in further combination four-terminal-networks with adjustable attenuation operatively connected respectively to said second impedances of said first and second divider networks.

9. A circuit arrangement for measuring impedances, particularly at high measuring frequencies, comprising three similarly constructed complex voltage divider networks, each comprising a series combination of a first impedance and a second impedance, a signal source, the output of which is connected in parallel with the respective series combination, operative to apply a test voltage thereto, said first impedances of said divider networks comprising fixed standard impedances of equal value, a first impedance to be measured connected in parallel with said second impedance of said first divider network, a second impedance to be measured connected in parallel with said second impedance of said second divider network, circuit means operatively connected to the respective voltage divider networks for deriving the difference of the voltage drop $U_x$ across said second impedance of the first divider network and the voltage drop $U_y$ across said second impedance of said second divider network, circuit means operatively connected to said voltage divider networks for deriving the difference of the voltage drop $U_0$ across said second impedance of said third divider network and said voltage drop $U_x$, circuit means operatively connected to said voltage divider networks for deriving the difference of said voltage drops $U_0$ and $U_y$, further circuit means operatively connected to said difference deriving circuit means for forming the product of said difference of the voltage drops $U_0$ and $U_x$ and of said difference of said voltage drops $U_0$ and $U_y$, and circuit means operatively connected to said product forming means for producing the quotient of said products, said quotient providing a determination of the value and phase and thus the real portion and the imaginary portion of the difference of said first and second impedances to be measured.

10. A circuit arrangement for measuring impedances, particularly at high measuring frequencies, comprising three similarly constructed complex voltage divider networks, each comprising a series combination of a first impedance and a second impedance, a signal source, the output of which is connected in parallel with the respective series combination, operative to apply a test voltage thereto, said first impedance of said divider networks comprising fixed standard impedances of equal value, a first impedance to be measured connected in parallel with said second impedance of said first divider network, a second impedance to be measured connected in parallel with said second impedance of said second divider network, circuit means operatively connected to the respective divider networks for deriving the difference of the voltage drop $U_0$ across said second impedance of said third divider network and the voltage drop $U_x$ across said second impedance of said first divider network, and circuit means operatively connected to said first mentioned circuit means for producing the quotient of said voltage drop $U_x$ and said difference of said voltage drops $U_0$ and $U_x$, said quotient providing a determination of the value and phase and thus the real portion and the imaginary portion of said first impedance to be measured.

11. A circuit arrangement for measuring impedances, particularly at at high measuring frequencies, comprising three similarly constructed complex voltage divider networks, each comprising a series combination of a first impedance and a second impedance, a signal source, the output of which is connected in parallel with the respective series combination, operative to apply a test voltage thereto, said first impedances of said divider networks comprising fixed standard impedances of equal value, a first impedance to be measured connected in parallel with said second impedance of said first divider network, circuit means operatively connected to said divider networks for deriving the difference of the voltage drop $U_0$ across said second impedance of said third divider network and the voltage drop $U_y$ across said second impedance of said second divider network, and circuit means for producing the quotient of said voltage drop $U_y$ and said difference of said voltage drops $U_0$ and $U_y$, said quotient providing a determination of the value and phase and thus the real portion and the imaginary portion of said second impedance to be measured.

12. A circuit arrangement for measuring impedances, particularly at high measuring frequencies, comprising three similarly constructed complex voltage divider networks, each comprising a series combination of first impedance and a second impedance, a signal source, the output of which is connected in parallel with the respective series combinations, operative to apply a test voltage thereto, respective impedances connected in parallel with respective second impedances of said first and second divider networks, at least one of said last mentioned impedances comprising an impedance to be measured, at least one of said impedances other than an impedance to be measured, comprising a fixed standard impedance, circuit means operatively connected to the respective voltage divider networks for deriving the difference between the voltage drops across selected respective second impedance, and further circuit means for producing a quotient from voltages selected from said voltage drops and different voltages derived from said last mentioned means, which quotient provides a determination of the value and phase and thus the real portion and the imaginary portion of an impedance being measured.

References Cited by the Examiner

UNITED STATES PATENTS

| | | | |
|---|---|---|---|
| 2,393,669 | 1/1946 | Wheaton et al. | 73—88 |
| 2,416,276 | 2/1947 | Ruge | 324—121 X |
| 2,468,625 | 4/1949 | Goetz | 324—62 |
| 2,479,051 | 8/1949 | Sunstein | 324—57 |
| 2,817,811 | 12/1957 | Sontheimer | 324—98 X |
| 3,038,119 | 5/1962 | Billig et al. | 324—57 |

WALTER L. CARLSON, *Primary Examiner.*

E. E. KUBASIEWICZ, *Assistant Examiner.*